April 21, 1931.　　　J. N. WHITE　　　1,801,403
COUPLING FOR REENFORCED FLEXIBLE HOSE
Filed Jan. 20, 1926
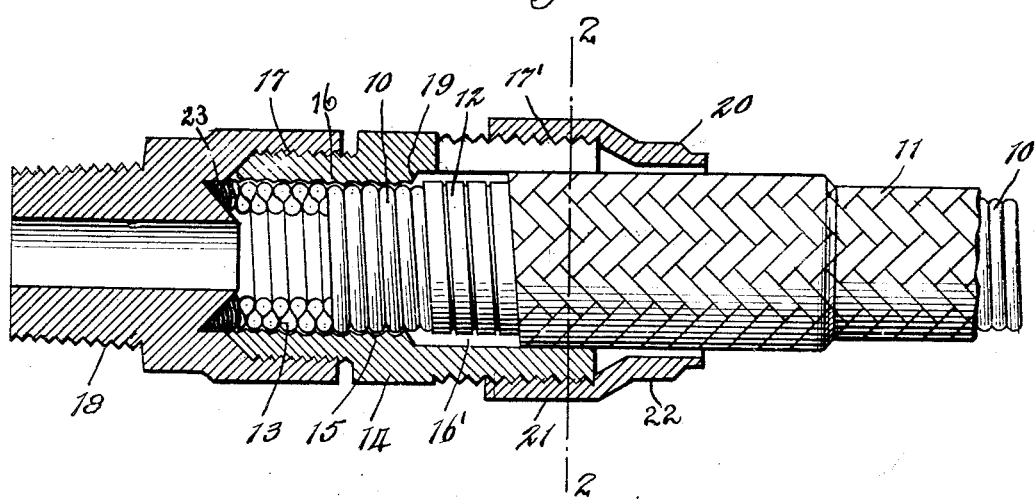
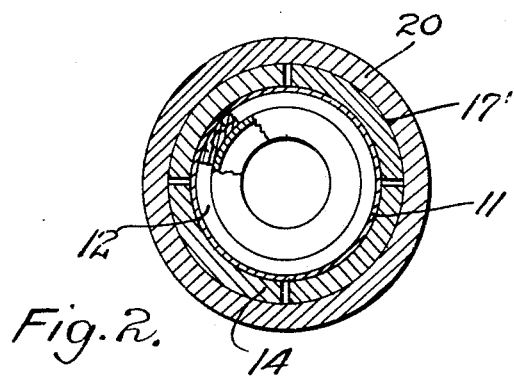
INVENTOR.
Jonathan Newton White
BY Warren S. Orton
ATTORNEY.

Patented Apr. 21, 1931

1,801,403

UNITED STATES PATENT OFFICE

JONATHAN NEWTON WHITE, OF NEW YORK, N. Y., ASSIGNOR TO UNITED METAL HOSE CO., INC., OF NEW YORK, N. Y., A CORPORATION OF NEW YORK

COUPLING FOR REENFORCED FLEXIBLE HOSE

Application filed January 20, 1926. Serial No. 82,448.

The invention relates in general to a pipe connection or coupling for an end of a flexible pipe or hose for use in securing the same to a pipe or other connection, and the invention particularly relates to a means for reenforcing the end of a sheathed, seamless flexible metal tubing and to a coupling coacting therewith to provide a rugged connection.

The present disclosure constitutes a companion application to my copending application entitled "Packless coupling for flexible hose", filed Jan. 20, 1926, Serial No. 82,447.

It is known in the prior art, as illustrated in the Patent to Levitt, No. 1,315,784, September 9, 1919, to cause a covered or sheathed inner tubing to be intruded into the bore of a coupling sleeve or barrel, one end of which barrel is split and adapted to be engaged by a clamping nut to secure the sheath or covering to the inner tubing. In order to prevent the tubing with its sheath covering from being bent at acute angles at or near the end of the coupling, and to distribute movement over the whole length of the seamless tubing, it has been known to enclose the sheathed tubing in an outside reenforcing sleeve which in turn is secured in different ways to the clamping nut.

Under some conditions it has been found in actual practice that this method of reenforcing the inner tubing did not give entire satisfaction, as it was impracticable to slip the outside reenforcement over the sheath or covering tight enough to function properly and at the same time avoid injury to the sheath or covering within the same. Creeping resulted between the outer reenforcement and the inner tubing with resulting scraping of the enclosed sheathing. As the reenforcement had to be spaced from the sheathed inner tubing its efficiency to prevent bends and localized strains was decreased.

The primary object of the present invention is to provide a form of reenforcement which will be simple in construction and effective in protecting the portion of the inner tubing which projects beyond the coupling from sharp bends and localized strains.

Broadly, I attain this phase of the invention by snugly fitting a flexible reenforcing sleeve between the inner tubing and its sheath or covering, and clamping the sheath on to the substantially rugged tubular structure provided by the inner tube and its encircling reenforcing sleeve.

Still another object of the invention is to provide for a more secure connection between the flexible pipe and the coupling than has been attained heretofore, and to provide a form of connection at a plurality of points and acting in such way as will minimize tendency to distort the flexible pipe.

Various other objects and advantages of the invention will be in part obvious from an inspection of the accompanying drawings and in part will be more full set forth in the following particular description of one form of mechanism embodying my invention, and the invention also consists in certain new and novel features of construction and combination of parts hereinafter set forth and claimed.

In the accompanying drawing, Figure 1 is a view in axial section through a coupling and in operative engagement with a flexible pipe and coacting to illustrate a preferred embodiment of the invention and Fig. 2 is a transverse sectional view taken on the line 2—2 of Fig. 1.

In the drawing, there is shown a flexible metallic inner tube 10 in the form of a seamless thin metal tube having spiral corrugations and which, for the major portion of its length, is covered with a sheath 11, in the instant case shown as the conventional form of metal braiding. As is usual with such construction, the braiding 11 fits snugly about the flexible metal tubing 10 for the major portion of the length of the inner tubing and terminates adjacent the end illustrated.

A feature of this disclosure is that a flexible reenforcing sleeve 12, preferably a short section of spirally wound flexible tubing, is positioned between the inner tubing 10 and its sheath 11 with a snug fit between these three tubular parts. The reenforcing sleeve is located adjacent to and slightly spaced from the end 13 of the inner tubing which is designed to be engaged by the coupling herein featured. The reenforcing sleeve is relatively short with a length to extend from about mid-length of the coupling and projects therefrom along the length of the hose for any desired distance. The portion of the inner tubing between the reenforcing sleeve 12 and the adjacent end 13 thereof is exposed and in the form illustrated provides a helically ribbed structure simulating coarse threads.

The coupling comprises a central member constituting a metal sleeve or barrel 14 provided with a bore 15 extending axially therethrough. Approximately one half of the bore is provided with threads 16 and the other half of which is enlarged to provide a smooth bored portion 16'. The reduced internally threaded end of the barrel is externally threaded as shown at 17 and is designed to be engaged by a seal forming and connecting nut or male top 18, more particularly described in my copending application above identified. The opposite, enlarged, smooth-bored end of the barrel is split along a plurality of longitudinal lines as is usual in such construction and is provided externally with a slightly tapered threaded portion 17' adapted to constitute a cylindrical jaw clamp.

The reenforced end of the flexible pipe is intruded into the smooth bored end 16' of the barrel with the exposed end 13 of the inner tube engaging the threads 17 provided in the threaded portion of the bore. The parts are screwed together until the reenforcing sleeve 12 engages or comes into proximity with the annular beveled shoulder 19 formed between the reduced and enlarged portions of the bore. The parts are so designed and constructed that the reenforcing sleeve with the metal braiding covering the same has a snug fit in the enlarged portion of the bore.

A packing or clamping nut 20 for contracting the split end clamp at this end of the barrel has an enlarged internally threaded portion which acts as it is advanced to contact the cylindrical jaw clamp into engagement with the braided covering 11. The nut 20 also includes a reduced outer portion 22 which loosely encircles the portion of the metal braiding 11 surrounding the reenforcing sleeve enclosed thereby.

In operation, it will be understood that as the clamping nut 20 is turned into its fully advanced position shown in the drawing, it has the effect of causing the split ends of the barrel to be moved into clamping engagement with the metal braiding. The reenforcing sleeve and the encircled portion of the inner metal tubing within the metal braiding provides a rugged resistance to the clamping effect of the split barrel end and in this way there is provided not only a secure and positive clamping of the metal braiding to the coupling, but there is also provided a secure connection between the reenforcing sleeve and the coupling without necessity of providing a separate fastening means for this purpose. As the reenforcing sleeve can be made to have a snug frictional fit about the inner metal tubing, the clamping connection herein featured incidentally provides a means for clamping the flexible inner tubing to the coupling without danger of distorting the tubing. This construction also tends to hold the metal tubing from any tendency of the same to unwind or unthread from its engagement with the threaded portion of the barrel.

The final operation in securing the hose to the coupling is to cause the male top 18 to be screwed into a sealing connection with the inner tubing to provide an all-metal seal 23 across the joint between the barrel and the male top in the manner more particularly described in the copending application.

By means of the device illustrated, it is possible to provide a neat form of connection between a flexible metal pipe and a coupling therefor, and to insure a positive, simple and easily manipulated form of connection between the hose and the coupling. The disclosure features an improved form of reenforcement for the inner tubing to insure the same against breakage adjacent its connection with the coupling. An efficient form of connection is attained and strain between the hose and the coupling are distributed in such way as to minimize the localizing of the strain adjacent the end of the coupling. Tendency towards relative movement between the metal braiding and its enclosed inner tubing has been minimized, if not entirely avoided, and the objectionable creeping of the reenforcing sleeve relative to the metal hose has been eliminated. As the reenforcing sleeve can be positioned on the inner tubing before the metal braiding is fabricated in place, any desired nicety of fit between the reenforcing sleeve and the inner tubing may be attained as a matter of factory practice and not dependent upon the skill of the operator mounting the hose to the coupling.

Having thus described my invention, I claim:

In a device of the class described, the combination with a coupling having a receiving end, of a tube construction having an end intruded into said coupling end, said construction comprising a flexible, corrugated metallic inner tubing, a metal sheath fitting snugly about the inner tubing for the major portion of its length, and means for reenforcing said construction at the place where it intrudes into the coupling end, to resist bending and distortion of the construction at this place, said means consisting of a short length of a rugged metallic reenforcing sleeve with one end thereof extending into the coupling and projecting a short distance therefrom beyond the coupling end, said sleeve having a snug fit on the inner tubing and engaged by and held from creeping thereon by the sheath.

Signed at New York, in the county of New York and State of New York, this 14th day of January, A. D. 1926.

JONATHAN NEWTON WHITE.